US012260625B1

(12) United States Patent
Mahieu et al.

(10) Patent No.: US 12,260,625 B1
(45) Date of Patent: Mar. 25, 2025

(54) VOXEL BASED MULTIRESOLUTION GROUND PLANE DETECTION

(71) Applicant: Zoox, Inc., Foster City, CA (US)

(72) Inventors: Robert Evan Mahieu, San Mateo, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 360 days.

(21) Appl. No.: 17/957,642

(22) Filed: Sep. 30, 2022

(51) Int. Cl.
*G06V 20/56* (2022.01)
*G06V 10/75* (2022.01)
*G06V 10/776* (2022.01)

(52) U.S. Cl.
CPC .......... *G06V 10/776* (2022.01); *G06V 10/751* (2022.01); *G06V 20/56* (2022.01)

(58) Field of Classification Search
CPC ..... G06V 10/776; G06V 10/751; G06V 20/56
See application file for complete search history.

(56) References Cited

U.S. PATENT DOCUMENTS

2017/0056926 A1\* 3/2017 Rothberg ............ B81C 1/00158

\* cited by examiner

*Primary Examiner* — Sam Bhattacharya
(74) *Attorney, Agent, or Firm* — Lee & Hayes, P.C.

(57) ABSTRACT

Techniques for determining ground surface voxels based on multiresolution planes are discussed herein. Such multiresolution planes may be generated, validated, and used to connect voxels associated with the ground. In some examples, a vehicle may use capture or otherwise receive lidar data while traversing within a driving environment. The vehicle may associate the lidar data with a voxel space. Voxels can be associated with a cell of a multiresolution grid and the vehicle may determine multiresolution planes associated with the multiresolution space. For example, the vehicle may determine a first plane associated with a first resolution level, in addition to determining a plurality of planes associated with a second resolution level. The vehicle may determine the validity of the plane(s) at the various resolution levels. Based on the validity of the planes, the vehicle may connect the valid planes that are associated with the ground surface.

20 Claims, 8 Drawing Sheets

VOXEL BASED MULTIRESOLUTION GROUND PLANE DETECTION

BACKGROUND

Sensor data can be captured to represent objects in an environment. In some cases, sensor data can be associated with a voxel space for subsequent processing. For example, an autonomous vehicle may associate sensor data with a voxel space in order to estimate a ground height in an environment. In some instances, the vehicle may fit planes to sensor data within a voxel space in order to create an estimated representation of the ground surface. However, such planes and the sensor data associated therewith may make ground determinations difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
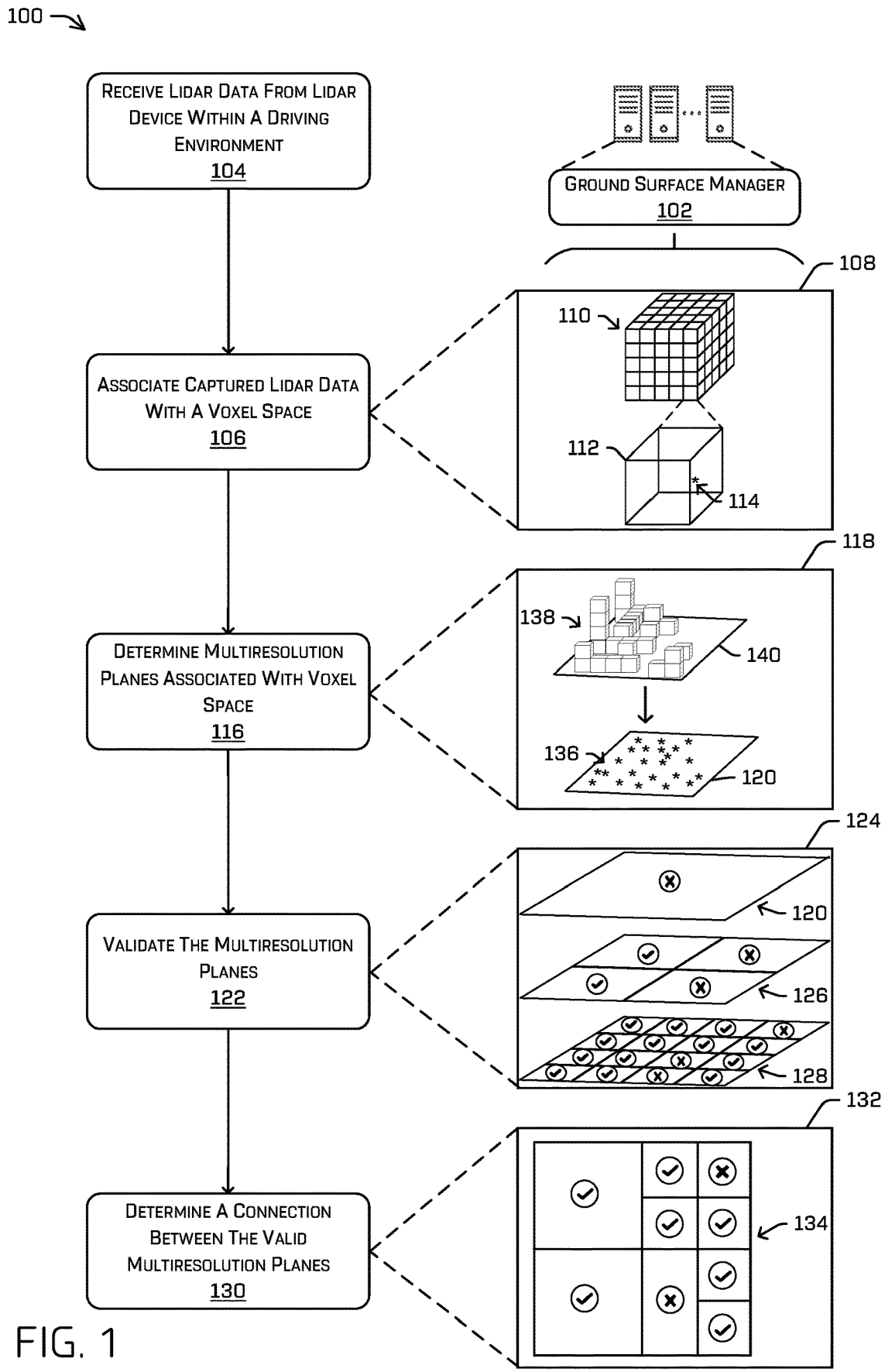
FIG. 1 is a pictorial flow diagram illustrating an example process for receiving lidar data from a lidar device, associating the lidar data with a voxel space, determining multiresolution planes associated with the voxel space, validating the multiresolution planes, and determining a connection between the valid multiresolution planes, in accordance with one or more examples of the disclosure.

This disclosure describes techniques for determining ground surface voxels based on multiresolution planes. As described herein, multiresolution planes may be generated, validated, and used to connect voxels associated with the ground surface. In some examples, a vehicle may use lidar devices to receive lidar data while traversing within a driving environment. The vehicle may associate the lidar data with a voxel space, which can include the lidar data in a grid of volume elements (e.g., voxels) that represents three-dimensional data. In some examples, the vehicle may determine multiresolution planes associated with the voxel space. For example, the vehicle may determine a first plane associated with a first resolution level, in addition to determining a plurality of planes associated with a second resolution level. The vehicle may determine the validity of some or all of the planes at the first and/or second resolution levels. Based on the validity of the planes at the various resolution levels, the vehicle may connect the valid planes that are associated with the ground surface. As discussed throughout this disclosure, the techniques may improve vehicle safety and driving efficiency by ensuring that the vehicle has an accurate representation of the ground surface, thereby allowing the vehicle to perform safer and more efficient driving maneuvers.

When an autonomous vehicle is operating within a driving environment, the vehicle may receive sensor data (e.g., captured by sensors of the vehicle or received from remote sensors) of the surrounding environment. The sensor data, which may include lidar data, radar data, time-of-flight data, etc., may be analyzed by the autonomous vehicle to detect and classify various objects within the operating environment. An autonomous vehicle may encounter various different types of objects within different driving environments, including dynamic objects that are capable of movement (e.g., vehicles, motorcycles, bicycles, pedestrians, animals, etc.) and/or static objects (e.g., buildings, road surfaces, trees, signs, barriers, parked vehicles, etc.). In order to safely traverse driving environments, an autonomous vehicle may include various components configured to detect objects and determine attributes of the detected objects. In some examples, a perception component of the autonomous vehicle may include various models and/or components to detect objects based on sensor data, in addition to classifying the objects. For instance, the perception component may analyze lidar data to detect an object near the vehicle, and may evaluate various components of the lidar data to segment, classify, and track the object. One or more prediction and/or planning components of the autonomous vehicle may use the output object detection and classification components to determine a driving path for the vehicle relative to the object. Any of the various components described herein may use one or more machine learning models and/or heuristics-based components to perform the respective sensor data analysis and driving functionality described herein.

In some examples, the autonomous vehicle may use a voxel space to evaluate lidar data. For example, the vehicle may associate lidar data with a voxel space. In such instances, the vehicle may perform statistical operations to the lidar data within the voxel space to identify metrics such as a mean x, y, and/or z location of the data represented by the voxel, a covariance of the data, a number of lidar points, etc. The statistical data (also referred to as accumulated data) associated with a voxel can be associated with one or more levels of a multiresolution grid, and the accumulated data from a number of voxels associated with an individual grid region can be used to determine a plane that may be representative of the ground surface. The vehicle may evaluate the one or more planes in order to determine one or more regions of the multiresolution grid that are associated with the ground surface.

When evaluating the plane(s) of the voxel space, the vehicle may misidentify and/or misclassify objects as being associated with the ground or associated with obstacles based on discarding invalid planes with large portions of lidar data. In some examples, a vehicle may evaluate a voxel space in order to estimate a position and/or height of the ground surface. In such examples, the vehicle can determine one or more three-dimensional planes associated with a voxel space. As used herein, a three-dimensional plane can be a two-dimensional plane oriented in three-dimensional space. The vehicle may evaluate the plane(s) to determine whether the plane(s) are valid (e.g., no outlier lidar points, locally flat, sufficient amount of lidar points, etc.). In response to determining that certain planes have inaccurate and/or invalid data, the vehicle may discard such planes and/or the associated lidar data. In some examples, the vehicle may select or otherwise determine the remaining valid planes to connect and create a representation of the ground surface for which the vehicle may use as it traverses throughout the environment. However, since the planes may be large in size and may include large amounts of lidar data, discarding invalid or inaccurate planes may discard more lidar data than needed, and in some situations, may result in discarding accurate lidar data as well. As such, when connecting the remaining plane(s), the vehicle may have a large, unrepresented portion of the environment with minimal information (e.g., lidar data). Consequently, the vehicle may misidentify portions of the environment without planes as being associated with undrivable paths, driving obstacles, etc. Accordingly, the autonomous vehicle may disengage from the trajectory, determine alternative and unnecessary trajectories, and/or transition from an autonomous driving mode to a manual driving mode based on such inaccurate detections.

To address the technical problems and inefficiencies of potentially misidentifying and/or misclassifying objects within the environment based on discarding large three-dimensional planes and/or the associating portions of lidar data, the techniques described here include using a ground surface manager-based system (which also may be referred to as a "ground surface manager") to determine ground surface voxels based on using multiresolution planes. Technical solutions discussed herein solve technical problems associated with discarding excessive amounts of lidar data based on invalidating three-dimensional planes.

Initially, the ground surface manager may receive lidar data captured by lidar sensors of an autonomous vehicle traversing within an environment. In some examples, the autonomous vehicle may include multiple lidar devices configured to receive lidar data of the driving environment.

In some examples, the ground surface manager may associate the sensor data with a voxel space. A voxel space may correspond to a physical region of the environment, whereby a voxel of the voxel space can represent a volume in the environment. In some examples, the ground surface manager may map lidar points of the lidar data to individual voxels within the voxel space. In such examples, the lidar data may be represented in the voxel space as raw lidar data (e.g., with individual <x, y, z, range, time, etc.> values associated with lidar points) or may be represented as a statistical accumulation of data. In some examples, the ground surface manager may evaluate one or more voxels of the voxel space to identify voxels that are associated with the ground surface (e.g., a drivable surface for an autonomous vehicle).

In some examples, the ground surface manager may determine one or more planes associated with the voxel space. For example, the ground surface manager may determine one or more two-dimensional cells at differing resolution levels (e.g., data levels). In some examples, the cells may include the lidar points and/or the statistical accumulation of data associated with some or all of the voxels within the voxel space. As such, the ground surface manager may determine that the statistical accumulation of data for a particular voxel may correspond to a region of the cell based on the location of the voxel (e.g. utilize the x and y coordinates of the statistical accumulation of data). In such examples, the ground surface manager may fit two-dimensional plane(s) oriented in a three-dimensional space to the lidar data and/or the statistical accumulation of the cell, creating a planar approximation of the lidar data.

In some examples, the ground surface manager may determine plane(s) at the differing resolution levels of the cell. The ground surface manager may determine three-dimensional planes at any number of resolution levels. For example, the ground surface manager may determine, for a portion of the voxel space associated with a region of the environment, a first plane at a first resolution level. The first resolution may include a plane covering a 2 meter×2 meter area. Further, the ground surface manager may determine, for the same portion of the voxel space as the first resolution level, a first plurality of planes at second resolution level. The second resolution may include four planes covering a 1 meter×1 meter area. In such instances, the four planes may cover the same 2 meter×2 meter area covered by the first plane. Further, the ground surface manager may determine, for the same portion of the voxel space as the first and second resolution levels, a second plurality of planes at a third resolution level. The third resolution level may include sixteen planes covering a 0.5 meter×0.5 meter area. However, this example is not intended to be limiting, the ground surface manager may determine that a first resolution, second resolution, third resolution, and/or any other resolution level may include planes that cover a larger or smaller area than those described above. Further, the ground surface manager may determine that the regions may include more or less planes at each resolution level.

In some examples, the ground surface manager may determine the validity of the planes. In some examples, the ground surface manager may validate the planes by determining that the plane does not include outlier lidar points and/or statistical accumulations of data (e.g., lidar points beyond a certain distance from the plane), verifying that the plane has a locally flat slope associated with the ground surface, and determining that the number lidar points and/or statistical accumulations of data associated with the plane meets or exceeds a threshold level.

For example, the ground surface manager may determine whether the plane has outlier lidar data. In such examples, the ground surface manager may evaluate whether the lidar points and/or statistical accumulation of data associated with the plane meet or exceed a threshold distance from the plane. In such instances, the ground surface manager may determine a height of the plane, and may also determine a height of one or more lidar points or one or more accumulations of data associated with the plane. In such examples, if the distance of the lidar point or accumulation of data from the plane meets or exceeds a threshold distance, the ground surface manager may determine that the plane contains outlier lidar data. Further, the ground surface manager may indicate that the plane is invalid and/or discard the plane.

In some examples, the ground surface manager may validate that the plane is locally flat and associated with the ground surface. The ground surface manager may determine that the plane is locally flat based on comparing a first reference vector of the plane with a second reference vector of the vehicle. For example, the ground surface manager may determine a first reference vector which may be a surface normal vector (e.g., extending perpendicularly from the plane, a vector of gravity, and/or any other type of vector). Further, the ground surface manager may determine a second reference vector extending perpendicularly from a central (e.g., centroid) location of the vehicle. In some instances, the ground surface manager may determine an angle based on the difference between the first reference vector and the second reference vector. The ground surface manager may compare the difference angle to a threshold value. If the difference angle meets or exceeds the threshold value (e.g., the plane and the vehicle are at different slopes), the ground surface manager may determine that the plane is an inaccurate representation of the environment (e.g., not locally flat). In such cases the ground surface manager may discard the plane and/or the associating lidar data. Alternatively, if the difference angle is below the threshold value, the ground surface manager may determine that the associated plane is locally flat.

In some examples, the ground surface manager may validate that the plane includes a threshold number of lidar points and/or statistical accumulations of data. For example, the ground surface manager may determine the number of lidar points and/or accumulations of data associated with the plane. In such examples, the ground surface manager may compare the number of lidar points and/or accumulations of data to a threshold number. If the number of lidar points and/or the number of accumulations of data are below the threshold number, the ground surface manager may determine that the plane may not include a sufficient amount of data to make an accurate determination regarding the ground surface. Alternatively, if the lidar points and/or number of accumulations of data meet or exceed the threshold number, the ground surface manager may determine that the plane includes sufficient data to make accurate determinations of regarding the ground.

In some examples, the ground surface manager may select or otherwise determine one or more planes to estimate the ground surface. The ground surface manager may select one or more planes that have been validated and determined to be associated with the ground. In some examples, the ground surface manager may select the largest plane (e.g., lowest resolution level; largest in area covered) of the validated planes for each region. For example, the ground surface manager may determine whether the first plane is valid. If the first plane is valid, the ground surface manager may select the first plane to represent that particular 2 meter×2 meter area of the driving environment. Alternatively, if the first plane is invalid, the ground surface manager may determine whether any of the first plurality of planes (e.g., the second resolution level) are valid. If one or more of the first plurality of planes are valid, the ground surface manager may select the valid planes of the first plurality of planes to represent the ground. Alternatively or additionally, if the first plane and one or more of the first plurality of planes are invalid, the ground surface manager may evaluate a portion of the second plurality of planes that are associated with the region of the environment in which the first plane and first plurality of planes were invalid. In such examples, the ground surface manager may select one or more valid planes from the second plurality of planes.

In some examples, the ground surface manager may connect the one or more selected planes to form a representation of the ground surface. For example, the ground surface manager may perform a directed connection algorithm in order to connect the selected planes. The ground surface manager may connect two planes together based on determining that two planes are adjacent to one another, in addition to determining that a height difference of the height of the first plane and the height of the second plane are less than a threshold height. Alternatively, if the ground surface manager determines that the height difference meets or exceeds a threshold height, the ground surface manager may determine that the two planes should not be connected.

As illustrated by these examples, the techniques described herein can improve the functioning, safety, an efficiency of the autonomous and semi-autonomous vehicles operating in various driving environments. The use of multiresolution planes to identify the ground as described herein may allow the vehicle to more efficiently and accurately identify voxels associated with the ground surface. For example, an autonomous vehicle may identify one or more planes that are associated with the ground surface. Further, techniques described herein allow the autonomous vehicle to use and/or maintain lidar data that would have otherwise been discarded, based on utilizing planes of differing resolution levels. Such techniques ensure that the autonomous vehicle has an accurate representation of the position and/or height of the ground, further ensuring that the vehicle does not need to alter its trajectory, stop abruptly, or disengage the autonomous mode.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like.

FIG. 1 is a pictorial flow diagram illustrating an example process 100 for receiving lidar data from a lidar device, associating the lidar data with a voxel space, determining multiresolution planes associated with the voxel space, validating the multiresolution planes, and determining a connection between the valid multiresolution planes. In various examples, some or all of the operations in process 100 may be performed by a ground surface manager component integrated within a perception component, a prediction component, a planning component, and/or other components and systems within an autonomous vehicle. For instance, as shown in this example, process 100 may be implemented using a ground surface manager 102. As described below in more detail, the ground surface manager 102 may include various components, such as a voxel component, a multiresolution plane fitting component, a plane validation component, a plane selecting component, and/or a plane connecting component, which may be configured to fit two-dimensional planes to lidar data associated with a voxel space, validate the planes, and/or connect valid planes to create a representation of the ground surface.

At operation 104, the ground surface manager 102 may receive lidar data collected by one or more lidar devices of an autonomous vehicle. In some examples, a vehicle may include multiple lidar devices mounted at various locations and various angles relative to the vehicle, to capture lidar data of a driving environment and/or from a single sensor acquired at multiple times. The lidar data may include any number of lidar points representing individual lidar detections from the driving environment.

At operation 106, the ground surface manager 102 may associate the captured lidar data with a voxel space. As described above, a voxel space may correspond to a physical region of the environment. In some examples, the ground surface manager 102 may include functionality to map, convert, or associate individual lidar points to a voxel of a voxel space representing a three-dimensional space in an environment. In such examples, the lidar data associated with the voxel space may be represented within the voxel space as raw lidar data (e.g., with individual <x, y, z, range, time, etc.> values associated with lidar points) or may be represented as a statistical accumulation of data. For example, box 108 illustrates a voxel space 110 and a voxel 112 with an accumulation of lidar data 114 (e.g., the statistical accumulation of the lidar points associated with the voxel) associated therein. In this example, the voxel space 110 may include five voxels in each dimension (e.g., x, y, z), although any number of voxels may be included in the voxel space 110. As shown in box 108, the voxel space 110 may include a voxel 112 that is enlarged for illustrative purposes. In some examples, the voxel 112 may include a single accumulation of lidar data 114 captured or otherwise received from the lidar devices.

In some examples, the voxel 112 of the voxel space 110 may include an accumulation of data 114 representing a number of lidar points, an average intensity of the lidar points, an average x-value of the lidar points, an average y-value of the lidar points, an average z-value of the lidar points, and/or a covariance matrix based on the lidar points associated with the voxel 112. Thus, in some instances, data associated with voxel 112 may represent processed data, in part, to improve processing performance of the system.

Example techniques for associating sensor data with voxel spaces can be found, for example, in U.S. Pat. No. 10,44,759, issued Oct. 15, 2019, and titled "Voxel Based Ground Plane Estimation and Object Segmentation," in addition to U.S. Patent Publication No. 2022/0111868, and titled "Estimating Ground Height based on Lidar Data," the contents of which is herein incorporated by reference in its entirety for all purposes.

In some examples, the ground surface manager 102 may identify one or more horizontal voxels based on the lidar data and/or the statistical accumulation of data. In some examples, the ground surface manager 102 may make an initial prediction regarding which voxels are associated with the ground surface. In such instances, the ground surface manager 102 may identify voxels which are laterally adjacent to one another. For example, the ground surface manager 102 may use the lidar points and/or the associating statistical accumulation of data 114 to identify laterally adjacent voxels. In some instances, the ground surface manager may use the laterally adjacent voxels to determine one or more three-dimensional planes.

At operation 116, the ground surface manager 102 may determine multiresolution planes associated with the voxel space. In some examples, the ground surface manager 102 may determine one or more two-dimensional cells with differing resolution levels based on the one or more horizontal voxels. In such examples, the ground surface manager may associate the statistical accumulation of data of each voxel to a region within the cell based on the statistical accumulation of data (e.g., utilize the x and y coordinates) relative to the cell. Further, the ground surface manager 102 may use the accumulation of data (e.g., of each voxel) within the cell to determine three-dimensional planes at differing resolution levels for a single region of the environment. In such examples, the ground surface manager 102 may fit planes to the lidar points or accumulation of data 114 associated therewith. For example, box 118 illustrates a plane 120 fit to lidar points or the statistical data 136 within a cell. As shown in FIG. 1, box 118 includes a portion of a voxel space 138 that corresponds to a physical region of an environment. Further, the portion of the voxel space 138 may be associated with a two-dimensional cell 140. In such examples, each voxel within the portion of the voxel space 138 may include a statistical accumulation of lidar data. The ground surface manager 102 may associate the statistical accumulation of lidar data for each voxel within the voxel space 138 to the cell 140. In some examples, the ground surface manager 102 may fit a plane 120 to the lidar points or statistical data 120 associated within the cell 140. The plane 120 may be a planar approximation of the statistical data 136. As shown in box 118, the plane 120 may be a first resolution plane.

In some examples, the ground surface manager 102 may determine one or more additional planes at different resolution levels which may cover the same physical region of the environment as the first resolution plane. Though not illustrated in box 118, in addition to the plane 120 at a first resolution level, the ground surface manager 102 may fit higher resolution planes to portions of the same lidar points or statistical data 114 covering the same region. In such examples, the ground surface manager 102 may determine a first plurality of planes at a second resolution level. The second resolution level may include four planes covering a 1 meter×1 meter area. Further, the ground surface manager 102 may determine a second plurality of planes (e.g., sixteen planes) at a third resolution level covering a 0.5 meter×0.5 meter area.

Example techniques for fitting a plane to sensor data within voxel spaces can be found, for example, in U.S. Pat. No. 10,44,759, issued Oct. 15, 2019, and titled "Voxel Based Ground Plane Estimation and Object Segmentation," the contents of which is herein incorporated by reference in its entirety for all purposes.

At operation 122, the ground surface manager 102 may validate the multiresolution planes. The ground surface manager 102 may validate some or all of the planes at each resolution level. For example, box 124 illustrates planes at multiple resolution levels with validation results. In this example, the plane 120 may be at a first resolution level, the first plurality of planes 126 may be at a second resolution level, and the second plurality of planes 128 may be at a third resolution level. The plane 120, the first plurality of planes 126, and the second plurality of planes 128 cover the same physical region of the environment. In some examples, the first resolution level may include a single 2 meter×2 meter plane 120, the second resolution level may include four 1 meter×1 meter planes 126, and the third resolution level may include sixteen 0.5 meter×0.5 meter planes. However, in other examples, each resolution level may include more or less planes, and may also include larger or smaller planes.

In some examples, the ground surface manager 102 may validate some or all of the planes at each resolution level. The ground surface manager 102 may validate that plane does not have outlier lidar points and/or statistical data 136 (e.g., lidar points and/or statistical data 136 beyond a certain distance from the plane), verifying that the plane has a locally flat slope associated with the ground, and determining that the number of lidar points and/or statistical data 136 associated with the plane meets or exceeds a threshold level. As shown in box 124, each plane may include a check mark to illustrate that the plane has no outliers, is locally flat, and has sufficient lidar points, or a "x" to indicate that the plane either has an outlier lidar point, has an insufficient amount of lidar points, or is not locally flat. In this example, the plane 120 has an "x" indicating that the plane 120 is either not locally flat or has at least one statistical data 136 that is an outlier. The first plurality of planes 126 has two planes with check marks and two planes with an "x." The second plurality of planes 128 has a number of planes with check marks and a number of planes with an "x."

In some examples, the ground surface manager 102 may determine whether the planes of each resolution level have outlier lidar points 114. The ground surface manager 102 may determine a first height of the plane 120 (e.g., or any other plane in the second or third resolution levels) and a second height of the lidar points and/or the accumulations of statistical data 136. In some examples, the ground surface manager 102 may compare the first height and the second height to determine a height difference. In such examples, the ground surface manager 102 may compare the height difference to a height threshold to determine whether the lidar point or statistical data 136 is an outlier. If the height difference meets or exceeds the height threshold, the ground surface manager 102 may determine that the lidar point or statistical data 136 is an outlier, and may invalidate and/or discard the plane with the associating lidar points. If the height difference is below the height threshold, the ground surface manager 102 may determine that the lidar points and/or statistical data 136 associated with the plane 120 do not include outliers.

In some examples, the ground surface manager 102 may validate that the plane 120 has a locally flat slope. The ground surface manager 102 may determine a first reference vector (e.g., surface normal vector) that extends perpendicularly from the plane 120. Further, the ground surface manager 102 may determine a second reference vector extending perpendicularly from a central (e.g., centroid) location of the vehicle. In some instances, the ground surface manager may determine an angle based on the difference between the first reference vector and the second reference vector. The ground surface manager may compare the difference angle to a threshold value. If the difference angle meets or exceeds the threshold value (e.g., the plane and the vehicle are at different slopes), the ground surface manager may determine that the plane 120 is an inaccurate representation of the environment (e.g., not locally flat). In such cases the ground surface manager may discard the plane 120 and/or the associating lidar data. Alternatively, if the difference angle is below the threshold value, the ground surface manager may determine that the associated plane 120 is locally flat.

At operation 130, the ground surface manager 102 may determine a connection between the valid multiresolution planes. In some examples, the ground surface manager 102 may connect planes that have been validated and selected in order to create an accurate representation of the ground surface. For example, the ground surface manager 102 may select planes that have been validated at the various resolution levels. The ground surface manager 102 may select the largest plane (e.g., lowest resolution level; largest area covered) of the validated planes for each region.

For example, box 132 illustrates a number of planes from different resolution levels which have been selected. In this example, the ground surface manager 102 may determine that the plane 120 was invalidated (e.g., illustrated by the "x"), and as such, did not select the plane 120. Based on determining that the plane 120 is invalid, the ground surface manager 102 may evaluate the second resolution level (e.g., the next largest planes). In this example, the ground surface manager 102 may determine that, from the first plurality of planes 126, two of the planes are valid, and two planes are invalid. As such, the ground surface manager 102 may select the two valid planes to represent the respective region. Further, based on determining that two planes at the second resolution level are invalid, the ground surface manager 102 may evaluate the second plurality of planes 128 of the third resolution that correspond to the same region in which the two invalidated planes covered. In such instances, the ground surface manager 102 may determine that, of the planes from the third resolution level, some are valid and some are invalid. Accordingly, as the third resolution level is the highest resolution level available, the ground surface manager 102 may select the valid planes to represent the respective regions. Further, the ground surface manager 102 may discard the invalid planes.

As described below in more detail (FIGS. 2 and 5), the ground surface manager 102 may connect the selected three-dimensional planes. In such examples, the ground surface manager 102 may create a connected plane 134 using one or more planes from the various resolution levels. As shown in box 132, the ground surface manager 102 connected the two selected planes from the second resolution, as well as numerous planes from the third resolution. In this example, the connected plane 134 includes portions within which no valid planes were determined. The ground surface manager 102 may perform a directed connection algorithm in order to connect the selected planes.

The ground surface manager may connect two planes together based on determining that two planes are adjacent to one another (e.g., based on plane identification values), in addition to determining that a height difference of the height of the first plane and the height of the second plane are less than a threshold height. Alternatively, if the ground surface manager determines that the height difference meets or exceeds a threshold height, the ground surface manager may determine that the two planes should not be connected. In some examples, the height of the planes may be based on the height of the proximate edges or corners of the two planes.

Figure 2:
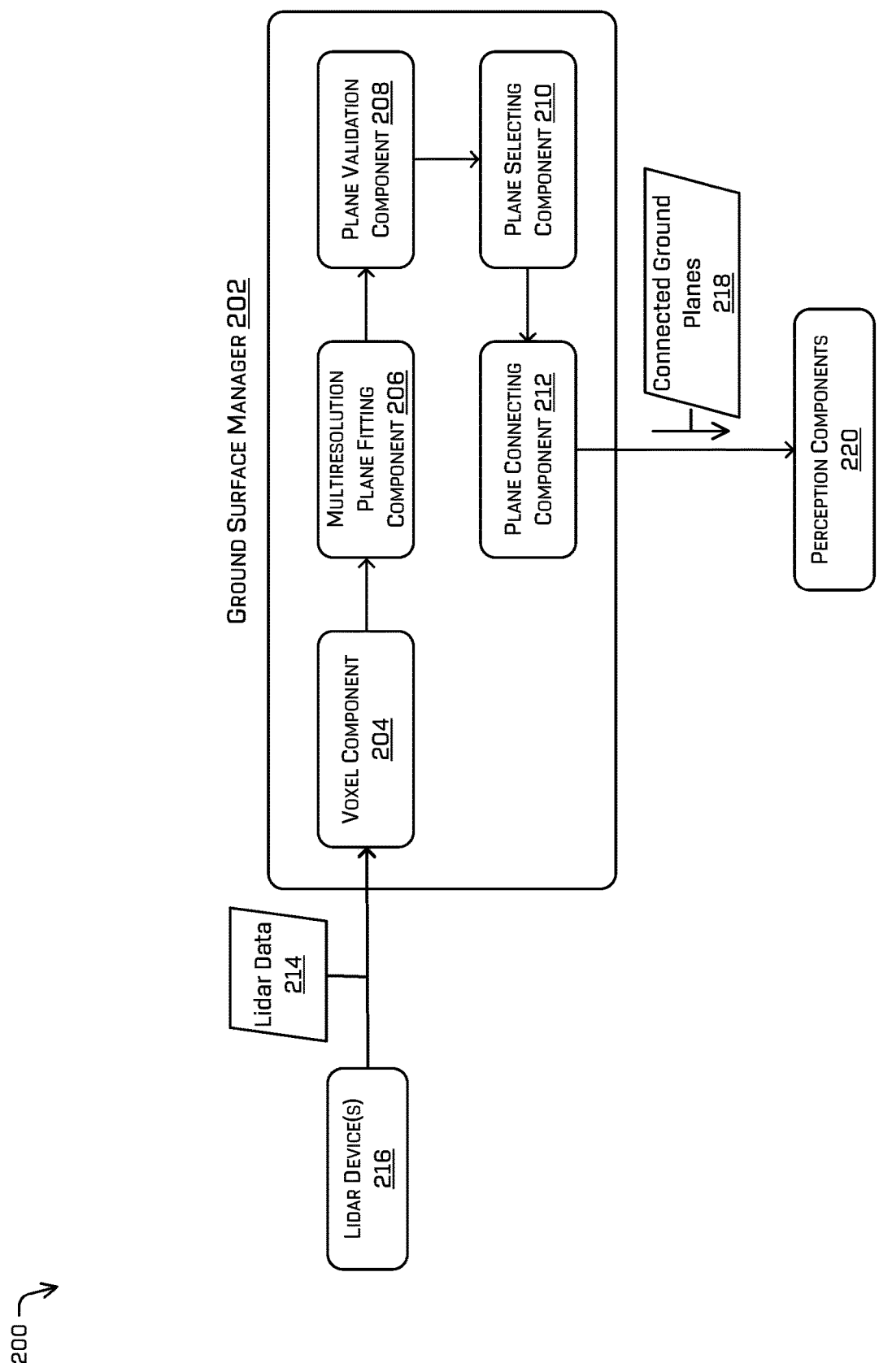
FIG. 2 illustrates an example computing system including an example ground surface manager configured to connect valid multiresolution planes, in accordance with one or more examples of the disclosure.

FIG. 2 illustrates an example computing system 200 including an example ground surface manager 202 configured to connect valid multiresolution planes.

In some examples, the ground surface manager 202 may be similar or identical to the ground surface manager 102 described above, or in any other examples herein. As noted above, in some cases the ground surface manager 202 may be implemented within or otherwise associated with a perception component, a prediction component, and/or a planning component of an autonomous vehicle. In some examples, the ground surface manager 202 may include various components, described below, configured to perform different functionalities of a voxel space ground detection technique. In some examples, the ground surface manager 202 may include a voxel component 204 configured to associate lidar data with a voxel space. Additionally, the ground surface manager 202 may include a multiresolution plane fitting component 206 configured to determine one or more multiresolution planes associated with the voxel space, a plane validation component 208 configured to validate some or all of the planes, a plane selecting component 210 configured to select one or more valid planes from one or more resolution levels, and/or a plane connecting component 212 configured to connect the selected planes.

In some examples, the ground surface manager 202 may receive lidar data 214 from one or more lidar device(s) 216 within (or otherwise associated with) an autonomous vehicle. Different lidar device(s) 216 may be mounted or installed at different locations on the autonomous vehicle, and may include various types of lidar devices providing various elements (or parameters) of lidar data 214 to the ground surface manager 202. As shown in FIG. 2, a lidar device 216 may provide lidar data 214 to the ground surface manager 202. In some examples, the lidar device 216 may capture unique lidar data based on the location and/or type of lidar device. As shown in this example, the ground surface manager 202 may include a voxel component configured to receive, store, synchronize, and/or analyze the lidar data 214.

In some examples, the ground surface manager 202 may include a voxel component 204 configured to associate lidar data with a voxel space. The voxel component 204 may define dimensions of a voxel space, including a length, width, and height of the voxel space. Further, the voxel component 204 may determine a size of individual voxels. In some instances, voxels may be a uniform size and shape throughout the voxel space, while in some instances, a size and/or density of voxels may vary based on a relative location in the voxel space. For example, a size of a voxel may increase or decrease in proportion to a distance of the voxel from an origin or center of the voxel space.

In some examples the voxel component 204 may receive lidar data from the lidar device(s) 216. The ground surface manager 202 and/or other components of the autonomous vehicle may combine or fuse lidar data from two or more lidar devices into a single lidar dataset. In some examples, the voxel component 204 may associated the lidar dataset with a voxel space. As described above, the lidar dataset may be represented in the voxel space as raw lidar data (e.g., with individual <x, y, z, range, time, etc.> values associated with lidar points) or may be represented as a statistical accumulation of data.

In some examples, the ground surface manager 202 may include a multiresolution plane fitting component 206 configured to determine one or more multiresolution planes associated with the voxel space. The multiresolution plane fitting component 206 may receive a voxel space from the voxel component 204. In some examples, the multiresolution plane fitting component 206 may determine one or more two-dimensional cells at differing resolution levels. In such examples, the ground surface manager 202 may associate the lidar data and/or the statistical accumulation of data with the cell according to the location of the statistical accumulation of data (e.g., utilize the x and y coordinates of the statistical data) relative to the cell. In such examples, the ground surface manager 202 may determine cells of multiple resolution levels and may fit one or more three-dimensional planes at the different resolution levels using the lidar data and/or statistical data associated with the cell. For example, the multiresolution plane fitting component 206 may use the lidar data and/or statistical accumulation of data to fit planes to such data by determining a planar approximation of the lidar data. In some instances, the multiresolution plane fitting component may define the dimensions of plane sizes for each resolution level, including the width and length. In some instances, the size of planes may change based on the environment, time of day, distance of the plane from the vehicle, and/or any other like factor.

In some examples, the ground surface manager 202 may include a plane validation component 208 configured to validate some or all of the planes. The plane validation component 208 may receive the plurality of plane from the multiresolution plane fitting component 206. As described above and below, the plane validation component 208 may validate some or all of the planes based on the lidar data and/or statistical data associated with each plane. In some examples, the plane validation component 208 may validate planes by determining that the region in which the plane covers does not include outlier lidar points. Further, the plane validation component 208 may validate that the plane has a locally flat slope, in addition to determining that the number of lidar points and/or statistical accumulations of data associated with the plane meet or exceed a threshold value. Additional description on plane validation is discussed below in FIG. 4 and throughout this disclosure.

In some examples, the ground surface manager 202 may include a plane selecting component 210 configured to select one or more valid planes from one or more different resolution levels. The plane selecting component 210 may receive the validated planes and/or validation results from the plane validation component 208. For example, the ground surface manager 102 may select planes that have been validated at the various resolution levels. The ground surface manager 102 may select the largest plane (e.g., lowest resolution level; largest area covered) of the validated planes for each region. Additional description on selecting planes is discussed below in FIGS. 3A and 3B, and throughout this disclosure.

In some examples, the ground surface manager 202 may include a plane connecting component 212 configured to connect the selected planes to create an estimation of the ground surface. The plane connecting component 212 may receive the selected planes from the plane selecting component 210. In some examples, the plane connecting component 212 may connect planes together based on determining that the planes are laterally adjacent to one another, in addition to determining that a height difference of the height of the first plane and the height of the second plane are less than a threshold height. In such situations, the ground surface manager 202 may determine the height of each plane based on the height of the proximate (e.g., touching, next to, adjacent to, etc.) edges or corners of the two planes. Alternatively, if the plane connecting component 212 determines that the height difference meets or exceeds a threshold height, the plane connecting component 212 may determine that the planes should not be connected. Such a situation may arise if a first plane is associated with the ground and a second plane is associated with a roof (e.g., or other similar object). In this case, the first plane and the second plane may both be locally flat and not include outlier lidar points; however, the height of the second plane (e.g., associated with the top of a flat roof) may be much higher than the height of the first plane (e.g., associated with the ground).

In some examples, the plane connection component 212 may perform a directed connection algorithm. For example, the plane connection component 212 may connect planes in a directed manner, so that the planes associated with the ground are being connected in a direction away from the origin of the vehicle. In some examples, each plane may include a plane identification. Such plane identification values may be assigned to the three-dimensional planes upon the fitting of the planes to the statistical data of the cell, or such plane identification values may be assigned to the planes after valid planes have been selected. In some examples, plane identification values may be a numerical value. Of course, in other situations the plane identification value may be any other type of value. The plane connection component 212 may connect a first plane with a first identification number with a second plane with a second identification number if the second identification number is higher than the first identification number. Such a connection algorithm may ensure that planes are being connected in a directed manner.

As shown in this example, the ground surface manager 202 may send the connected ground planes 218 for further processing. In such examples, based on the ground surface manager 202 having connected one or more planes associated with the ground, the ground surface manager 202 may send the connected ground planes 218 to the perception components 220. In some examples, the perception components 220 may use the connected ground planes to identify one or more voxels of the voxel space which are associated with the ground surface.

Figure 3A:
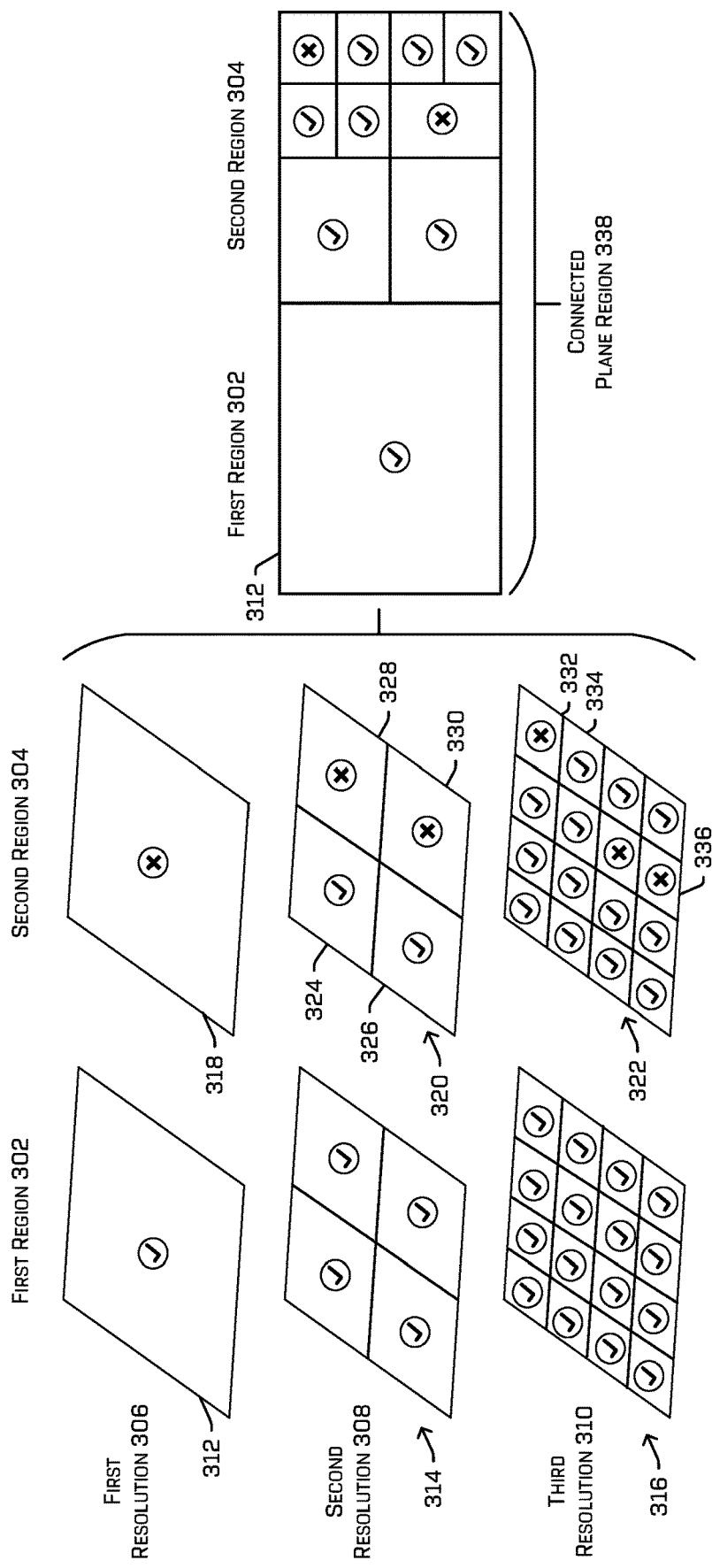
FIG. 3A illustrates example regions of planes to be connected based on validation results of three-dimensional planes at multiple resolution levels, in accordance with one or more examples of the disclosure.

FIG. 3A illustrates example regions 300 of planes to be connected based on validation results of three-dimensional planes at multiple resolution levels. In some examples, FIG. 3A may illustrate the algorithms used to select and connect multiresolution planes.

In some examples, the example regions 300 may include a number of planes at different resolution levels. In such examples, the example regions 300 may include a first region 302 and a second region 304. In some examples, the first region 302 and the second region 304 may include two-dimensional planes at a first resolution level 306, at a second resolution level 308, and a third resolution level 310.

In some examples, the first region 302 may be representative of a first physical region of the environment. The first region 302 may include a first plane 312 at a first resolution level 306, a first plurality of planes 314 at a second resolution level 308, and a second plurality of planes 316 at a third resolution level 310. In this example, the first plurality of planes 314 and the second plurality of planes 316 may cover the same or similar physical region as the first plane at the first resolution level.

In this example, some or all of the planes at the various resolution levels may have been identified as valid or invalid planes. As shown in FIG. 3A, valid planes may be illustrated by a check mark, while invalid planes are illustrated with an "x." In this example, the first plane 312 of the first region 302 may be identified as a valid plane. Further, all of the planes of the first plurality of planes 314 and the second plurality of planes 316 may be indicated as valid as well.

In some examples, the second region 304 may be representative of a second physical region of the environment. The second physical region may be laterally adjacent to the first physical region. In some examples, the second region 304 may include a second plane 318 at a first resolution level, a third plurality of planes 320 at a second resolution level 308, and a fourth plurality of planes 322 at a third resolution level 310. In this example, the second plane 318 of the second region 304 may be identified as an invalid plane. Further, the third plurality of planes 320 may include plane 324 and plane 326 which have been identified as valid, while plane 328 and plane 330 have been identified as invalid. The fourth plurality of planes 322 may include numerous planes which have been identified as valid or invalid. Specifically, plane 332 and plane 334 have been identified as invalid while plane 336 has been identified as valid.

In some examples, a ground surface manager may select planes to be connected to create a representation of the ground. In some examples, the ground surface manager may select the largest plane (e.g., lowest resolution level; largest area covered) of the validated planes. In this example, the connected planes region 338 illustrates the planes that were selected by the ground surface manager. For example, the ground surface manager may select, from the first region, the first plane 312 of the first resolution level. The first plane 312 is the largest, valid plane associated with the first region 302, and as such, the ground surface manager need not evaluate the planes in the second and third resolution levels.

Further, the ground surface manager may select, from the second region, numerous planes from the different resolution levels. In some examples, the ground surface manager may determine that the second plane 318 is invalid, and as such may discard the plane. In such examples, the ground surface manager may evaluate the third plurality of planes 320 of the second resolution level. The ground surface manager may select the plane 324 and the plane 326, as both planes have been identified as valid planes. In this example, the plane 328 and the plane 330 may be identified as invalid. As such, the ground surface identifier may evaluate planes of the third resolution level which cover the same or similar region as the plane 328 and the plane 330. The ground surface manager may select a number of planes from the third resolution level which have been identified as valid.

As shown in FIG. 3A, the example regions 300 may have a connected plane region 338 which illustrates connected planes from the first region 302 and the second region 304. The connected plane region 338 includes the first plane 312 from the first region 302, plane 324 and 326 from the second resolution level 308, and multiple planes from the third resolution level 310. The connected plane region 338 illustrates multiple areas wherein planes were not selected due to the lidar data in such areas being inaccurate.

In some examples, the ground surface manager may connect planes together based on determining that planes are adjacent to one another, in addition to determining that a height difference of the height of a first plane and the height of a second plane are less than a threshold height. Alternatively, if the ground surface manager determines that the height difference meets or exceeds a threshold height, the ground surface manager may determine that the two planes should not be connected. Additional description about connecting planes is provided below in FIG. 5 and throughout this disclosure.

Figure 3B:
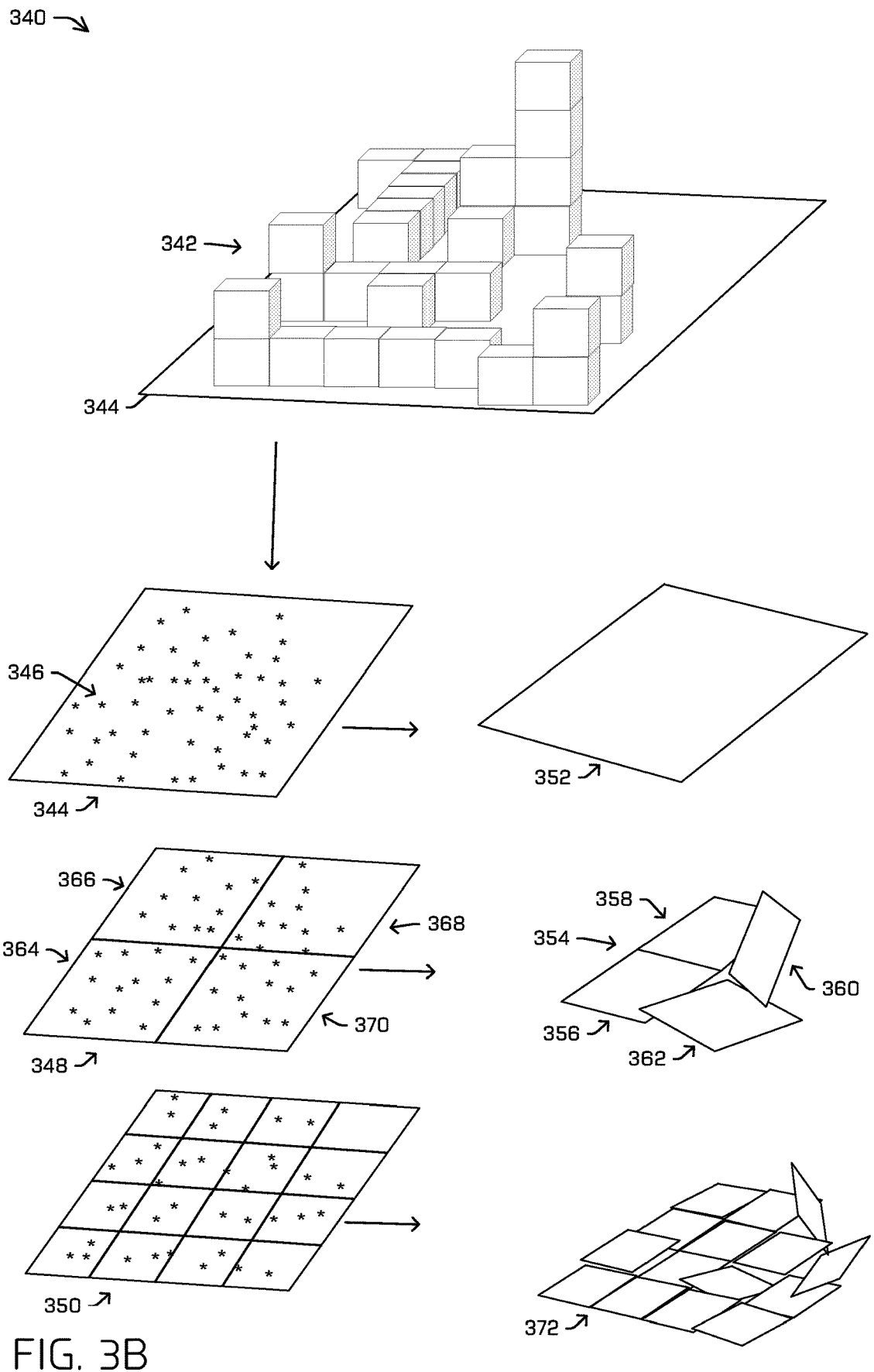
FIG. 3B illustrates an example region of three-dimensional planes based on a voxel space, in accordance with one or more examples of the disclosure.

FIG. 3B illustrates an example region of three-dimensional planes based on a voxel space. In some examples, FIG. 3B may illustrate the operations performed to determine the three-dimensional planes from the voxel space.

In some examples, the example region 340 may include a number of representations. In such examples, the example region 340 may include a portion of a voxel space 342. The voxel space 342 may include a number of individual voxels which may represent a physical space in the environment (for the purposes of illustration the voxel space 342 may include voxels containing data while omitting voxels without data, for example). Further, the example region 340 may include a two-dimensional cell 344. The cell 344 may cover a region of the physical environment upon which voxels may be located.

In some examples, the example region 340 may associate the statistical accumulations of data found within each voxel of the voxel space to the cell 344. In such examples, the statistical accumulations of data 346 may be associated to a location within the cell 344 based on the statistical accumulation of data (e.g., utilize the x and y coordinates of the accumulation of data).

As shown in FIG. 3B, a ground surface manager 202 may determine cells of differing resolution levels. In such instances, the cell 344 may be a first resolution level, which the cell 344 may be partitioned to determine multiresolution cells. For example, the first plurality of cells 348 at a second resolution level, and the second plurality of cells 350 at a third resolution level, may cover the same or similar region of the environment as the cell 344 of the first resolution level. In some examples, the first plurality of cells 348 and the second plurality of cells 350 may include the same statistical accumulations of data 346 as found in the cell 344.

In some examples, the ground surface manager 202 may determine three-dimensional planes based on the statistical accumulation of data found within the particular cell. In such instances, the ground surface manager 202 may fit the three-dimensional planes to the statistical accumulations of data 346 for the particular cell, creating a planar approximation of the statistical accumulation of data 346 found therein. For example, the ground surface manager 202 may determine a first plane 352 which may be fit to the statistical accumulations of data 346 associated with the cell 344. Further, the ground surface manager 202 may determine a first plurality of three-dimensional planes 354. In such examples, the first plurality of planes 354 may include a plane 356, a plane 358, a plane 360, and a plane 362. The ground surface manager 202 may fit the plane 356 to the statistical accumulation of data within cell 364. Further, the ground surface manager 202 may fit the plane 358 to the statistical accumulation of data within cell 366, the plane 360 to the statistical accumulation of data within cell 368, and the plane 362 to the statistical accumulation of data within cell 370.

In some examples, the ground surface manager 202 may perform similar functions and fit a second plurality of planes 372 to the statistical accumulations of data of the individual cells of the second plurality of cells 350. Thus, the planes can represent a three-dimensional ground surface.

Figure 4:
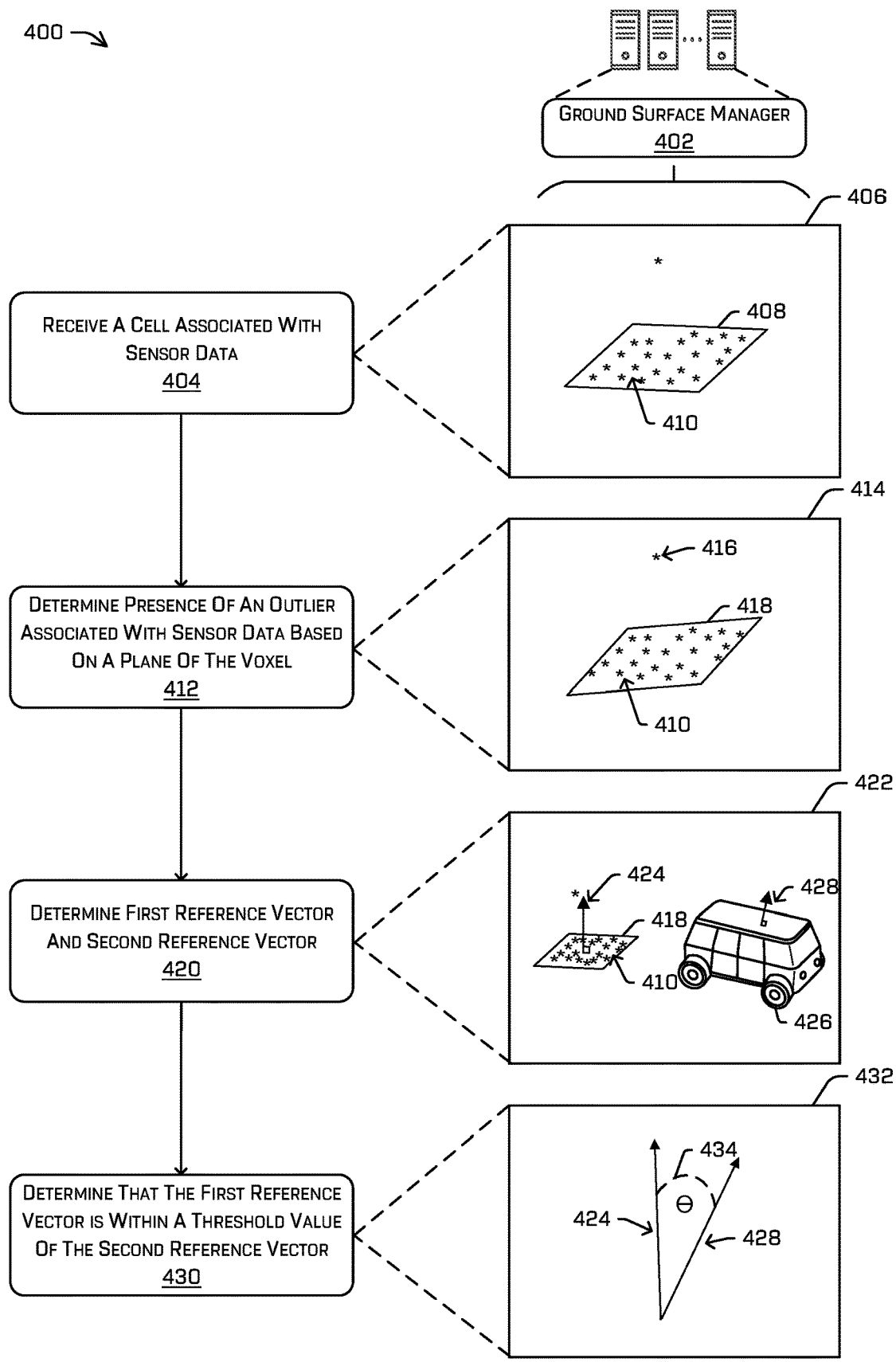
FIG. 4 is a pictorial flow diagram illustrating an example process for validating three-dimensional planes, in accordance with one or more examples of the disclosure.

FIG. 4 is a pictorial flow diagram illustrating an example process 400 for validating two-dimensional planes. In various examples, some or all of the operations in process 100 may be performed by a ground surface manager component integrated within a perception component, a prediction component, a planning component, and/or other components and systems within an autonomous vehicle. For instance, as shown in this example, process 100 may be implemented using a ground surface manager 102. In some examples, the ground surface manager 402 may be similar or identical to the ground surface manager 102 and 202 described above, or in any other examples herein.

At operation 404, the ground surface manager 402 may receive a cell associated with sensor data. For example, the ground surface manager 402 may receive a cell including lidar data (e.g., lidar points, statistical accumulations of data, etc.) that has been mapped or converted from a voxel space to the cell, as discussed above in connection with FIGS. 1 and 2. For example, box 406 illustrates a cell 408 with lidar data 410 associated therein. In this example, the lidar data 410 associated with the cell 408 may be represented within the cell 408 as raw lidar data (e.g., with individual <x, y, z, range, time, etc.> values associated with lidar points) or may be represented as a statistical accumulation of data.

At operation 412, the ground surface manager 402 may determine the presence of an outlier associated with the lidar data relative to a three-dimensional plane. In some examples, the ground surface manager 402 may fit a three-dimensional plane to the lidar data 410 associated with the cell 408. For example, box 414 illustrates a three-dimensional plane 418 fit to the lidar data 410 associated with the cell 408. In this example, the box 414 may illustrate a single plane 418 associated with the cell 408. Though not illustrated, the ground surface manager 402 may determine additional planes at different resolution levels. In some examples, the ground surface manager 402 may perform validating operations to some or all of the planes to verify that the plane is associated with the ground.

In some examples, the ground surface manager 402 may determine whether the plane 418 includes outlier lidar data relative to the plane 418. The ground surface manager 402 may determine a first height of the plane 418 and a second height of the lidar point 416 (e.g., or a statistical accumulation of data). In some examples, the ground surface manager 402 may compare the first height and the second height to determine a height difference. In such examples, the ground surface manager 402 may compare the height difference to a height threshold to determine whether the lidar point 416 is an outlier. If the height difference meets or exceeds the height threshold, the ground surface manager 402 may determine that the lidar point 416 is an outlier, and may invalidate and/or discard the plane 418. If the height difference is below the height threshold, the ground surface manager 402 may determine that the lidar points 410 associated with the plane 418 do not include outliers.

At operation 420, the ground surface manager 402 may determine a first reference vector (e.g., surface normal vector) and a second reference vector. As described above, the ground surface manager 402 may determine a first reference vector (e.g., surface normal vector, vector of gravity, etc.) that extends perpendicularly from the plane 418. Further, the ground surface manager 402 may determine a second reference vector corresponding to an orientation of the vehicle. As a non-limiting example, the second reference vector may comprise a unit vector along a height direction of the autonomous vehicle. Thus, as the autonomous vehicle travels on a variety of surfaces (flat surfaces, up/down hills, on side slopes, etc.) the reference direction may vary. As such, the second reference vector may extend perpendicularly from a central (e.g., centroid) location of the vehicle. For example, the box 422 illustrates a first reference vector extending from a plane and a second reference vector extending from a vehicle. In this example, the plane 418 has a first reference vector 424 extending at a perpendicular angle. Further, the box 422 includes vehicle 426 which has a second reference vector 428 extending at a perpendicular angle from a central location of the vehicle 426.

At operation 430, the ground surface manager 402 determines that the first reference vector 424 is below a threshold of the second reference vector 428. For example, box 432 illustrates the ground surface manager 402 determining a difference angle 434 based on the difference between the first reference vector 424 and the second reference vector 428. The ground surface manager 402 may compare the difference angle 434 to a threshold value. If the difference angle 434 meets or exceeds the threshold value, the ground surface manager 402 may determine that the plane 418 is an inaccurate representation of the environment (e.g., not locally flat). In such cases the ground surface manager 402 may discard the plane 418. Alternatively, if the difference angle 434 is below the threshold value, the ground surface manager 402 may determine that the associated plane 418 is locally flat.

Figure 5:
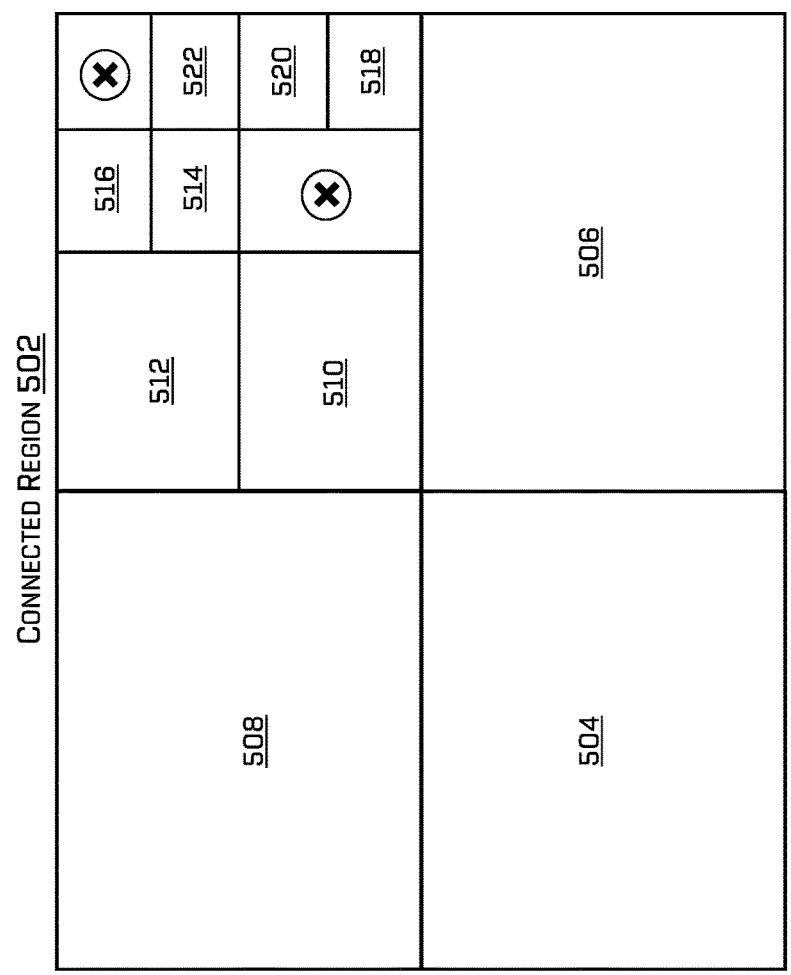
FIG. 5 depicts an example gird connected multiresolution planes, in accordance with one or more examples of the disclosure.

FIG. 5 depicts an example gird 500 connected multiresolution planes. In some examples, FIG. 5 describes the directed connection algorithm.

In some examples, the example grid 500 may include a connected region 502. In some examples, the connected region 502 may include any number of planes from various resolution levels. As shown in FIG. 5, the connected region 502 may include plane 504, plane 506, and plane 508 from a first resolution level. Further, the connected region 502 may include plane 510 and plane 512 from a second resolution level. The connected region 502 may also include plane 514, plane 516, plane 518, plane 520, and plane 522 from the third resolution level. In some examples, each of the above described planes may have been selected to represent the ground surface for the physical area. Of course this is an example, in other examples the connected region 502 may include more or less planes from any of the resolution levels.

As described above, a ground surface manager 202 may connect planes in a directed manner, so that the planes associated with the ground are being connected in a direction away from the origin of the vehicle. In some examples, each plane may include a plane identification. In some examples, plane identification values may be a numerical value. In some instances, the planes may be provided a plane identification number in an increasing manner. The ground surface manager 402 may connect a first plane with a second plane based on the second plane having a higher plane identification value. Such a connection algorithm may ensure that planes are being connected in a directed manner.

As shown in this example, the ground surface manager 402 start with plane 504 and parse through the other planes to determine if plane 504 may connect to another plane. In some examples, plane 504 may connect with plane 506, plane 508, and plane 510, based on such planes having higher identification numbers than plane 504. In such examples, the ground surface manager may move to plane 506. Plane 506 may be connected with plane 510 and plane 518, based on such planes having higher identification numbers than plane 506. In this example, the ground surface manager 402 may not look to plane 504, as plane 504 has a lower identification value than plane 506. Such a process of connecting may continue to grow the ground region as large and dense as possible. In such examples, the ground surface manager 402 may parse through each of the selected planes to attempt to connect such planes with other selected planes.

Figure 6:
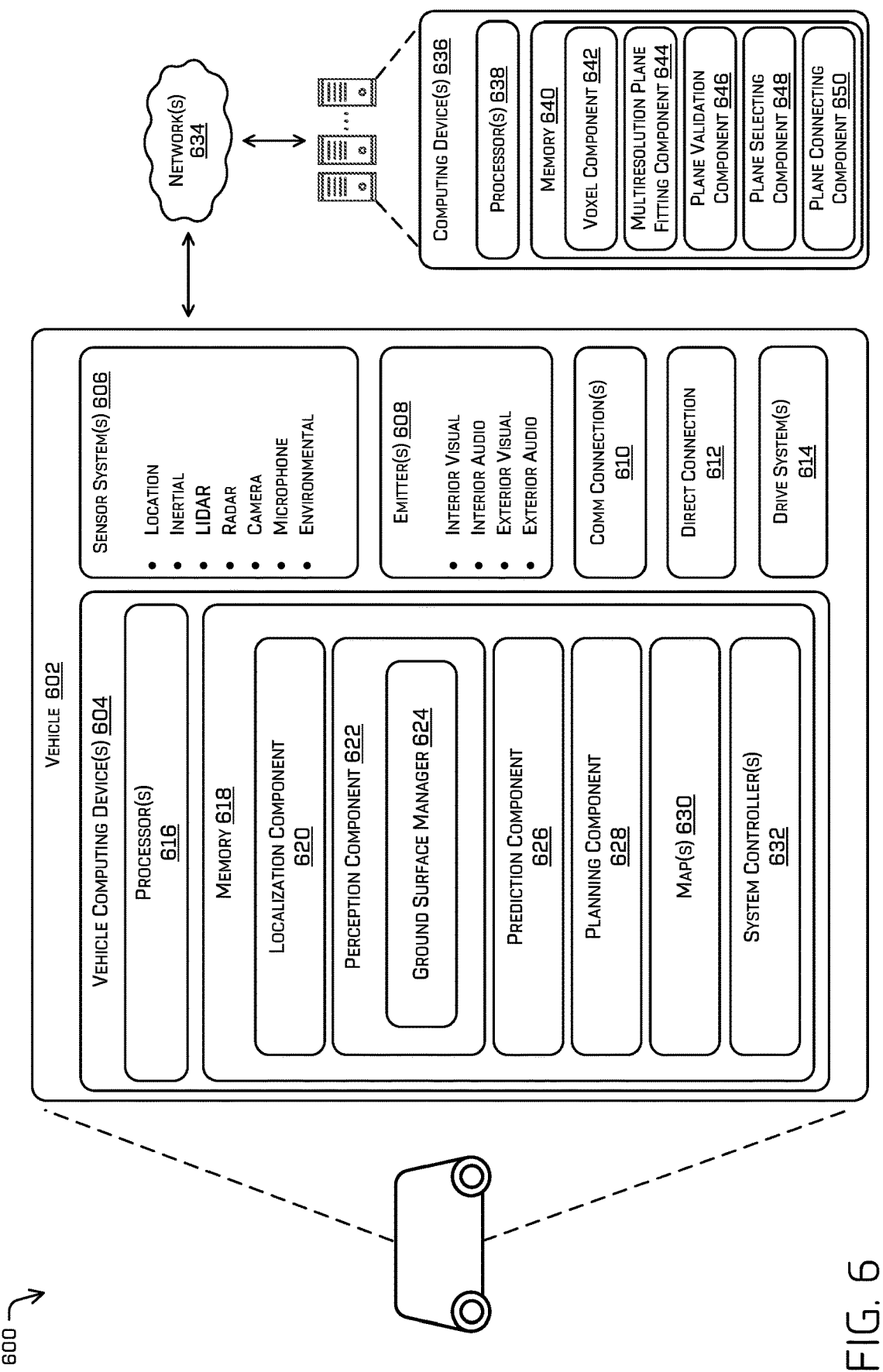
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622 including a ground surface manager 624, a prediction component 626, a planner component 628, one or more system controllers 632, and one or more maps 630 (or map data 630). Though depicted in FIG. 7 as residing in the memory 618 for illustrative purposes, it is contemplated that the localization component 620, the perception component 622 including the one or more ground surface manager 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636). In some examples, the memory 640 may include a voxel component 642, a multiresolution plane fitting component 644, a plane validation component 646, a plane selecting component 648, and a plane connecting component 650.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The ground surface manager 624 may be perform any of the techniques described with respect to any of FIGS. 1-5 above with respect to identifying voxels associated with the ground surface based on multiresolution planes.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the ground surface manager 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the ground surface manager 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a voxel component 642, a multiresolution plane fitting component 644, a plane validation component 646, a plane selecting component 648, and a plane connecting component 650. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the voxel component 642, the multiresolution plane fitting component 644, the plane validation component 646, the plane selecting component 648, and the plane connecting component 650 may perform substantially similar functions as the ground surface manager 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
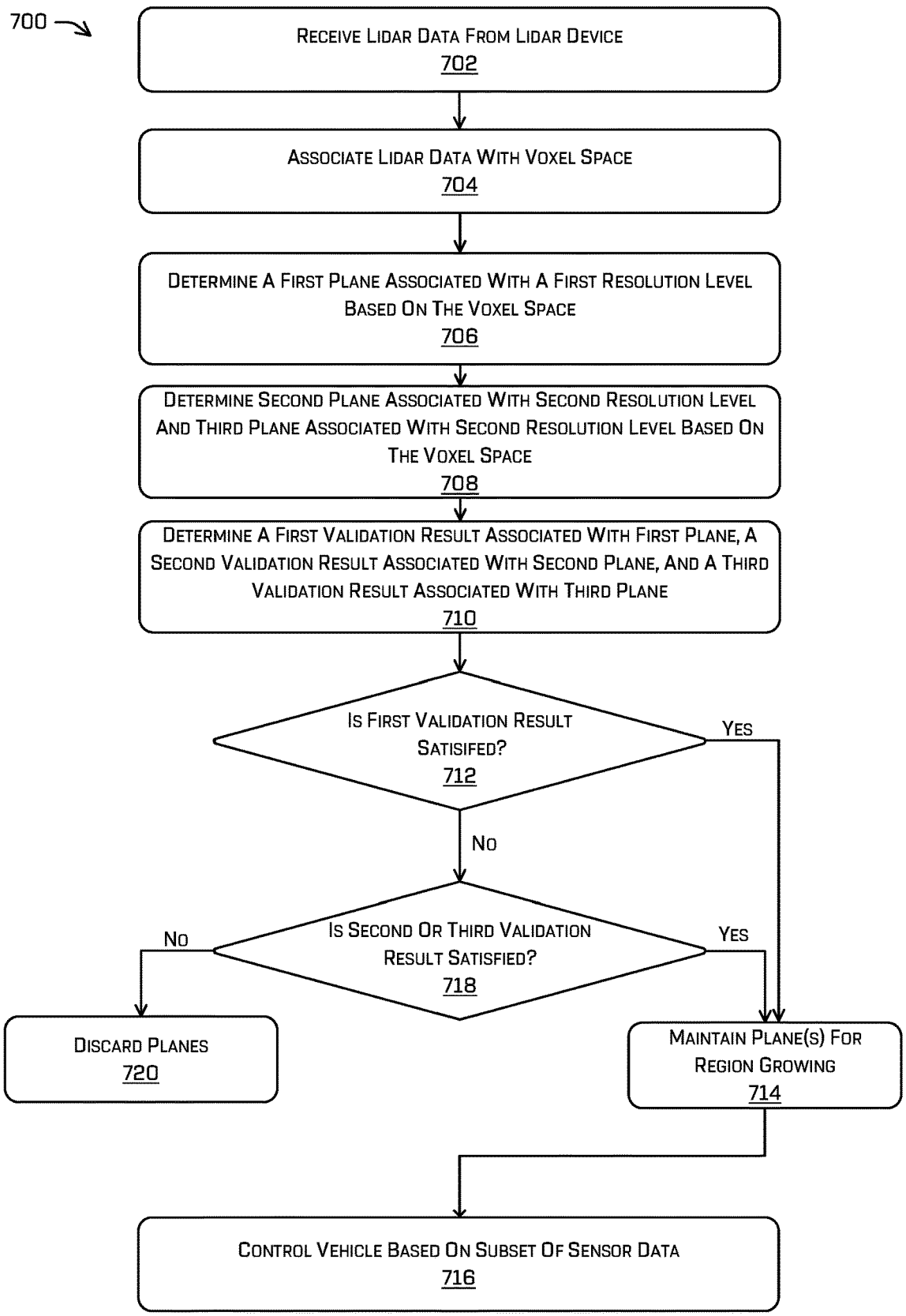
FIG. 7 is a flow diagram illustrating an example process of associating lidar data with a voxel space, determining multiresolution planes based on the voxel space, validating the planes, and connecting the valid planes to represent a ground surface, in accordance with one or more examples of the disclosure.

FIG. 7 is a flow diagram illustrating an example process 700 of associating lidar data with a voxel space, determining multiresolution planes based on the voxel space, validating the planes, and connecting the valid planes to estimate a ground surface. As described below, process 700 may be performed by one or more computer-based components configured to implement various functionalities described herein. For instance, some or all of the operations of process 700 may be performed by a ground surface manager 202 configured to receive lidar data, determine multiresolution planes based on associating the lidar data with a voxel space, and connecting valid planes to represent a ground surface. As described above, a ground surface manager 202 may be integrated as an on-vehicle system in some examples.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the ground surface manager 202 may receive lidar data from a lidar device. In some examples, the autonomous vehicle may include multiple lidar devices mounted at various locations and various angles relative to the vehicle, to capture lidar data of a driving environment and/or from a single sensor acquired at multiple times.

At operation 704, the ground surface manager 202 may associate the lidar data with a voxel space. As described above, a voxel space may correspond to a physical region of the environment, whereby a voxel of the voxel space can represent a volume in the environment. In some examples, the ground surface manager 202 may map lidar points of the lidar data to individual voxels within the voxel space. In such examples, the lidar data may be represented in the voxel space as raw lidar data or may be represented as a statistical accumulation of data.

At operation 706, the ground surface manager 202 may determine a first plane associated with a first resolution level based on the voxel space. As described above, the ground surface manager 202 may determine a two-dimensional cell which includes the statistical data from each of the voxels within the voxel space. In such examples, the ground surface manager 202 may fit a first three-dimensional plane to the lidar points and/or statistical accumulation of data of the cell. In such examples, fitting the first plane to the lidar data may include determining a planar approximation of the lidar data associated with the cell. The first plane may cover a region of the physical driving environment. In some examples, the first plane of the first resolution may cover a 2 meter×2 meter area. Of course, the size of the first resolution is an example, the ground surface manager 202 may determine larger or smaller planes for the first resolution level.

At operation 708, the ground surface manager 202 may determine a second and a third plane associated with a second resolution level. As described above, the second plane and the third plane may be two-dimensional planes that cover the same or similar region as the first plane of the first resolution. In some examples, the ground surface manager 202 may determine that the second resolution may cover a 1 meter×2 meter area. However, this example is not intended to be limiting, the ground surface manager 202 may determine that the second resolution may include additional planes that cover a larger or smaller area than those described above.

At operation 710, the ground surface manager 202 determine validation results for the first plane, the second plane, and the third plane. In some examples, the ground surface manager 202 may determine the validity of the planes. In some examples, the ground surface manager 202 may validate the planes by determining that the plane does not include any outlier lidar points (e.g., lidar points beyond a certain distance from the plane), verifying that the plane has a locally flat slope, and determining that the number of lidar points and/or statistical accumulations of data meet or exceed a threshold amount.

For example, the ground surface manager 202 may determine whether the plane has outlier lidar data. In such examples, the ground surface manager 202 may evaluate whether the lidar points and/or statistical accumulations of data associated with the cell (e.g., covering the region where the plane represents) meet or exceed a threshold distance from the plane. In such instances, the ground surface manager 202 may determine a height of the plane, and may also determine a height of one or more lidar points and/or one or more statistical accumulations of data associated with the cell. In such examples, if the distance of the lidar point or accumulation of data from the plane meets or exceeds a threshold distance, the ground surface manager 202 may determine that the plane contains outlier lidar data. Further, the ground surface manager 202 may discard the plane and/or associating lidar data.

In some examples, the ground surface manager 202 may validate that the plane is locally flat. The ground surface manager 202 may determine that the plane is locally flat based on comparing a first reference vector (e.g., surface normal vector) of the plane with a second reference vector of the vehicle. For example, the ground surface manager 202 may determine a first reference vector (e.g., surface normal vector, vector of gravity, etc.) that is extends perpendicularly from the plane. Further, the ground surface manager 202 may determine a second reference vector extending perpendicularly from a central (e.g., centroid) location of the vehicle. In some instances, the ground surface manager 202 may determine an angle based on the difference between the first reference vector and the second reference vector. The ground surface manager 202 may compare the difference angle to a threshold value. If the difference angle meets or exceeds the threshold value (e.g., the plane and the vehicle are at different slopes), the ground surface manager 202 may determine that the plane is an inaccurate representation of the environment (e.g., not locally flat). In such cases the ground surface manager 202 may discard the plane and/or the associating lidar data. Alternatively, if the difference angle is below the threshold value, the ground surface manager may determine that the associated plane is locally flat.

In some examples, the ground surface manager 202 may validate that the plane includes a threshold number of lidar points and/or statistical accumulations of data. For example, the ground surface manager 202 may determine the number of lidar points and/or accumulations of data associated with the plane. In such examples, the ground surface manager 202 may compare the number of lidar points and/or accumulations of data to a threshold number. If the number of lidar points and/or the number of accumulations of data are below the threshold number, the ground surface manager 202 may determine that the plane may not include a sufficient amount of data to make an accurate determination regarding the ground surface. Alternatively, if the lidar points and/or number of accumulations of data meet or exceed the threshold number, the ground surface manager 202 may determine that the plane includes sufficient data to make accurate determinations of regarding the ground.

In some examples, the ground surface manager 202 may perform such validation checks on the first plane, the second plane, and the third plane.

At operation 712, the ground surface manager 202 may determine whether the first plane at the first resolution level is valid. As described above, the first plane may be valid if the lidar data associated therewith does not include outliers, if the first plane is locally flat, and if the first plane includes a sufficient amount of lidar data. If the first plane is valid (712: Yes), then the ground surface manager 202 may maintain the first plane for region growing. In such examples, at operation 714, the ground surface manager 202 may select the largest plane (e.g., lowest resolution level; largest are covered) of the validated planes. At operation 716, the process 700 can include controlling the vehicle based on the selected two-dimensional plane. For example, the prediction and planning components may engage system controllers of the vehicle to execute a trajectory that was generated based on the determination of the ground surface height.

In contrast, if the first plane is invalid (712: No), the ground surface manager may determine whether the second plane or the third plane are identified as valid. At operation 718, the ground surface manager 202 may determine whether the second and third planes at the second resolution level are valid. If the one or both of the planes are valid (718: Yes), the ground surface manager 202 may maintain the valid plane for region growing. In contrast, if the one of the planes is invalid (718: No), the ground surface manager may discard the invalid plane and not rely on such a plane for region growing. At operation 720, the ground surface manager 202 may discard the invalid planes.

Example Clauses

A: A system comprising: one or more processors; and one or more computer-readable media storing computer-executable instructions that, when executed, cause the one or more processors to perform operations comprising: receiving, from a sensor device, sensor data associated with an autonomous vehicle operating in an environment; associating the sensor data with a voxel space; determining, based at least in part on the sensor data within the voxel space, that a subset of voxels of the voxel space are laterally adjacent to one another; determining, based at least in part on a voxel of the subset of voxels, a first plane associated with a first resolution representing a first region of space of the environment; determining, based at least in part on the voxel, a second plane and a third plane associated with a second resolution, the second resolution differing from the first resolution, wherein a second region of space associated with the second plane and third plane corresponds to a portion of the first region of space of the first plane; determining a first validation result associated with the first plane; determining a second validation result associated with the second plane and a third validation result associated with the third plane; determining, based at least in part on the first validation result, the second validation result, and the third validation result, that planes are associated with a ground surface; determining, based at least in part on the planes being associated with the ground surface, a connection between the planes; and controlling, based at least in part on the connection of the planes, the autonomous vehicle within the environment.

B: The system of paragraph A, wherein determining the connection between the planes comprises: determining that the second plane is adjacent to the third plane; determining, based at least in part on the second plane being adjacent to the third plane, a first height associated with the second plane; determining a second height associated with the third plane; determining, based at least in part on the first height and the second height, a height difference; and determining, based at least in part on the height difference being below a threshold height, the connection between the second plane and the third plane.

C: The system of paragraph A, wherein determining the first validation result comprises: determining, based at least in part on a pose of the autonomous vehicle, a reference vector; determining a surface normal vector associated with the first plane; and determining, based at least in part on determining that an angle between the reference vector and the surface normal vector is below threshold angle, that the first plane is associated with a ground surface.

D: The system of paragraph A, wherein the sensor data comprises a set of sensor points, and wherein determining the first validation result comprises: determining, based at least in part on the sensor data, a first height associated with the first plane; determining a second height associated with a sensor point associated with the set of sensor points; determining, based at least in part on the first height and the second height, a height difference; and determining, based at least in part on comparing the height difference to a threshold value, that the first plane is locally flat.

E: The system of paragraph A, further comprising: determining, based at least in part on the connection of the planes, at least a portion of the voxel space is associated with the ground surface.

F: One or more non-transitory computer-readable media storing instructions executable by one or more processors, wherein the instructions, when executed, cause the one or more processors to perform operations comprising: receiving sensor data from a sensor associated with a vehicle operating in an environment; associating the sensor data with a voxel of a voxel space; determining, based at least in part on the voxel, a first plane associated with a first data level representing a first region of space of the environment; determining, based at least in part on the voxel, a second plane associated with a second data level different than the first data level, wherein a second region of space associated with the second plane corresponds to a portion of the first region of space of the first plane; determining a first validation result associated with the first plane; determining a second validation result associated with the second plane;

and determining, based at least in part on the first validation result and the second validation result, a connection between planes that are associated with a ground surface.

G: The one or more non-transitory computer-readable media of paragraph F, wherein determining the connection between the planes comprises: determining that the second plane is adjacent to a third plane associated with the second data level; determining, based at least in part on the second plane being adjacent to the third plane, a first height associated with the second plane; determining a second height associated with the third plane; determining, based at least in part on the first height and the second height, a height difference; and determining, based at least in part on the height difference being below a threshold height, the connection between the second plane and the third plane.

H: The one or more non-transitory computer-readable media of paragraph F, wherein determining the first validation result comprises: determining, based at least in part on a pose of an autonomous vehicle, a first reference vector; determining a second reference vector associated with the first plane; and determining, based at least in part on determining that an angle between the first reference vector and the second reference vector is below threshold angle, that the first plane is associated with a ground surface.

I: The one or more non-transitory computer-readable media of paragraph F, wherein the sensor data comprises a set of sensor points, and wherein determining the first validation result comprises: determining, based at least in part on the sensor data, a first height associated with the first plane; determining a second height associated with a sensor point associated with the set of sensor points; determining, based at least in part on the first height and the second height, a height difference; and determining, based at least in part on comparing the height difference to a threshold value, that the first plane is locally flat.

J: The one or more non-transitory computer-readable media of paragraph F, the operations further comprising: determining, based at least in part on the connection of the planes, at least a portion of the voxel space is associated with the ground surface.

K: The one or more non-transitory computer-readable media of paragraph F, the operations further comprising: determining, based at least in part on the voxel, a plurality of planes associated with a third data level that differs from the first data level and the second data level; determining a plurality of validation results associated with the plurality of planes; and determining, based at least in part on the plurality of validation results, that one or more second planes are associated with the ground surface.

L: The one or more non-transitory computer-readable media of paragraph F, wherein the sensor data comprises at least one of lidar data, image data, radar data, sonar data, or time of flight data.

M: The one or more non-transitory computer-readable media of paragraph F, the operations further comprising: controlling, based at least in part on the connection of the planes, the vehicle within the environment.

N: A method comprising: receiving sensor data from a sensor associated with a vehicle operating in an environment; associating the sensor data with a voxel of a voxel space; determining, based at least in part on the voxel, a first plane associated with a first data level representing a first region of space of the environment; determining, based at least in part on the voxel, a second plane associated with a second data level different than the first data level, wherein a second region of space associated with the second plane corresponds to a portion of the first region of space of the first plane; determining a first validation result associated with the first plane; determining a second validation result associated with the second plane; and determining, based at least in part on the first validation result and the second validation result, a connection between planes that are associated with a ground surface.

O: The method of paragraph N, wherein determining the connection between the planes comprises: determining that the second plane is adjacent to a third plane associated with the second data level; determining, based at least in part on the second plane being adjacent to the third plane, a first height associated with the second plane; determining a second height associated with the third plane; determining, based at least in part on the first height and the second height, a height difference; and determining, based at least in part on the height difference being below a threshold height, the connection between the second plane and the third plane.

P: The method of paragraph N, wherein determining the first validation result comprises: determining, based at least in part on a pose of an autonomous vehicle, a first reference vector; determining a second reference vector associated with the first plane; and determining, based at least in part on determining that an angle between the first reference vector and the second reference vector is below threshold angle, that the first plane is associated with a ground surface.

Q: The method of paragraph N, wherein the sensor data comprises a set of sensor points, and wherein determining the first validation result comprises: determining, based at least in part on the sensor data, a first height associated with the first plane; determining a second height associated with a sensor point associated with the set of sensor points; determining, based at least in part on the first height and the second height, a height difference; and determining, based at least in part on comparing the height difference to a threshold value, that the first plane is locally flat.

R: The method of paragraph N, further comprising: determining, based at least in part on the connection of the planes, at least a portion of the voxel space is associated with the ground surface.

S: The method of paragraph N, the operations further comprising: determining, based at least in part on the voxel, a plurality of planes associated with a third data level that differs from the first data level and the second data level; determining a plurality of validation results associated with the plurality of planes; and determining, based at least in part on the plurality of validation results, that one or more second planes are associated with the ground surface.

T: The method of paragraph N, the operations further comprising: controlling, based at least in part on the connection of the planes, the vehicle within the environment.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing computer-executable instructions that, when executed, cause the one or more processors to perform operations comprising:
      receiving, from a sensor device, sensor data associated with an autonomous vehicle operating in an environment;
      associating the sensor data with a voxel space;
      determining, based at least in part on the sensor data within the voxel space, that a subset of voxels of the voxel space are laterally adjacent to one another;
      determining, based at least in part on a voxel of the subset of voxels, a first plane associated with a first resolution representing a first region of space of the environment;
      determining, based at least in part on the voxel, a second plane and a third plane associated with a second resolution, the second resolution differing from the first resolution, wherein a second region of space associated with the second plane and the third plane corresponds to a portion of the first region of space of the first plane;
      determining a first validation result associated with the first plane;
      determining a second validation result associated with the second plane and a third validation result associated with the third plane;
      determining, based at least in part on the first validation result, the second validation result, and the third validation result, that planes are associated with a ground surface;
      determining, based at least in part on the planes being associated with the ground surface, a connection between the planes; and
      controlling, based at least in part on the connection of the planes, the autonomous vehicle within the environment.

2. The system of claim 1, wherein determining the connection between the planes comprises:
   determining that the second plane is adjacent to the third plane;
   determining, based at least in part on the second plane being adjacent to the third plane, a first height associated with the second plane;
   determining a second height associated with the third plane;
   determining, based at least in part on the first height and the second height, a height difference; and
   determining, based at least in part on the height difference being below a threshold height, the connection between the second plane and the third plane.

3. The system of claim 1, wherein determining the first validation result comprises:
   determining, based at least in part on a pose of the autonomous vehicle, a reference vector;
   determining a surface normal vector associated with the first plane; and
   determining, based at least in part on determining that an angle between the reference vector and the surface normal vector is below threshold angle, that the first plane is associated with the ground surface.

4. The system of claim 1, wherein the sensor data comprises a set of sensor points, and wherein determining the first validation result comprises:
  determining, based at least in part on the sensor data, a first height associated with the first plane;
  determining a second height associated with a sensor point associated with the set of sensor points;
  determining, based at least in part on the first height and the second height, a height difference; and
  determining, based at least in part on comparing the height difference to a threshold value, that the first plane is locally flat.

5. The system of claim 1, further comprising:
  determining, based at least in part on the connection of the planes, at least a portion of the voxel space is associated with the ground surface.

6. One or more non-transitory computer-readable media storing instructions executable by one or more processors, wherein the instructions, when executed, cause the one or more processors to perform operations comprising:
  receiving sensor data from a sensor associated with a vehicle operating in an environment;
  associating the sensor data with a voxel of a voxel space;
  determining, based at least in part on the voxel, a first plane associated with a first data level representing a first region of space of the environment;
  determining, based at least in part on the voxel, a second plane associated with a second data level different than the first data level, wherein a second region of space associated with the second plane corresponds to a portion of the first region of space of the first plane;
  determining a first validation result associated with the first plane;
  determining a second validation result associated with the second plane; and
  determining, based at least in part on the first validation result and the second validation result, a connection between planes that are associated with a ground surface.

7. The one or more non-transitory computer-readable media of claim 6, wherein determining the connection between the planes comprises:
  determining that the second plane is adjacent to a third plane associated with the second data level;
  determining, based at least in part on the second plane being adjacent to the third plane, a first height associated with the second plane;
  determining a second height associated with the third plane;
  determining, based at least in part on the first height and the second height, a height difference; and
  determining, based at least in part on the height difference being below a threshold height, the connection between the second plane and the third plane.

8. The one or more non-transitory computer-readable media of claim 6, wherein determining the first validation result comprises:
  determining, based at least in part on a pose of an autonomous vehicle, a first reference vector;
  determining a second reference vector associated with the first plane; and
  determining, based at least in part on determining that an angle between the first reference vector and the second reference vector is below threshold angle, that the first plane is associated with the ground surface.

9. The one or more non-transitory computer-readable media of claim 6, wherein the sensor data comprises a set of sensor points, and wherein determining the first validation result comprises:
  determining, based at least in part on the sensor data, a first height associated with the first plane;
  determining a second height associated with a sensor point associated with the set of sensor points;
  determining, based at least in part on the first height and the second height, a height difference; and
  determining, based at least in part on comparing the height difference to a threshold value, that the first plane is locally flat.

10. The one or more non-transitory computer-readable media of claim 6, the operations further comprising:
  determining, based at least in part on the connection of the planes, at least a portion of the voxel space is associated with the ground surface.

11. The one or more non-transitory computer-readable media of claim 6, the operations further comprising:
  determining, based at least in part on the voxel, a plurality of planes associated with a third data level that differs from the first data level and the second data level;
  determining a plurality of validation results associated with the plurality of planes; and
  determining, based at least in part on the plurality of validation results, that one or more second planes are associated with the ground surface.

12. The one or more non-transitory computer-readable media of claim 6, wherein the sensor data comprises at least one of lidar data, image data, radar data, sonar data, or time of flight data.

13. The one or more non-transitory computer-readable media of claim 6, the operations further comprising:
  controlling, based at least in part on the connection of the planes, the vehicle within the environment.

14. A method comprising:
  receiving sensor data from a sensor associated with a vehicle operating in an environment;
  associating the sensor data with a voxel of a voxel space;
  determining, based at least in part on the voxel, a first plane associated with a first data level representing a first region of space of the environment;
  determining, based at least in part on the voxel, a second plane associated with a second data level different than the first data level, wherein a second region of space associated with the second plane corresponds to a portion of the first region of space of the first plane;
  determining a first validation result associated with the first plane;
  determining a second validation result associated with the second plane; and
  determining, based at least in part on the first validation result and the second validation result, a connection between planes that are associated with a ground surface.

15. The method of claim 14, wherein determining the connection between the planes comprises:
  determining that the second plane is adjacent to a third plane associated with the second data level;
  determining, based at least in part on the second plane being adjacent to the third plane, a first height associated with the second plane;
  determining a second height associated with the third plane;
  determining, based at least in part on the first height and the second height, a height difference; and determining, based at least in part on the height difference being below a threshold height, the connection between the second plane and the third plane.

16. The method of claim 14, wherein determining the first validation result comprises:
   determining, based at least in part on a pose of an autonomous vehicle, a first reference vector;
   determining a second reference vector associated with the first plane; and
   determining, based at least in part on determining that an angle between the first reference vector and the second reference vector is below threshold angle, that the first plane is associated with the ground surface.

17. The method of claim 14, wherein the sensor data comprises a set of sensor points, and wherein determining the first validation result comprises:
   determining, based at least in part on the sensor data, a first height associated with the first plane;
   determining a second height associated with a sensor point associated with the set of sensor points;
   determining, based at least in part on the first height and the second height, a height difference; and
   determining, based at least in part on comparing the height difference to a threshold value, that the first plane is locally flat.

18. The method of claim 14, further comprising:
   determining, based at least in part on the connection of the planes, at least a portion of the voxel space is associated with the ground surface.

19. The method of claim 14, further comprising:
   determining, based at least in part on the voxel, a plurality of planes associated with a third data level that differs from the first data level and the second data level;
   determining a plurality of validation results associated with the plurality of planes; and
   determining, based at least in part on the plurality of validation results, that one or more second planes are associated with the ground surface.

20. The method of claim 14, further comprising:
controlling, based at least in part on the connection of the planes, the vehicle within the environment.

* * * * *